United States Patent [19]

Das et al.

[11] Patent Number: 4,650,838

[45] Date of Patent: Mar. 17, 1987

[54] THERMOSETTABLE MODIFIED PHENOLIC RESINS

[75] Inventors: Sajal Das, Parsippany; Dusan C. Prevorsek, Morristown, both of N.J.

[73] Assignee: Allied Corporation, Morris Township, Morris County, N.J.

[21] Appl. No.: 821,587

[22] Filed: Jan. 23, 1986

[51] Int. Cl.$^4$ .......................... C08G 8/28; C08G 8/36
[52] U.S. Cl. .................................... 525/504; 528/153; 525/502
[58] Field of Search ................. 525/502, 504; 528/153

[56] References Cited

U.S. PATENT DOCUMENTS

| | | | |
|---|---|---|---|
| 3,444,137 | 5/1969 | Higginbottom et al. | 525/504 X |
| 3,448,079 | 6/1969 | Grigat et al. | 525/504 |
| 3,717,615 | 2/1973 | Holub et al. | 525/504 |
| 3,966,670 | 6/1976 | Grazen et al. | |
| 4,022,755 | 5/1977 | Tanigaichi et al. | 525/504 |
| 4,096,108 | 6/1978 | Webb et al. | |
| 4,218,361 | 8/1980 | Searjean et al. | |
| 4,219,452 | 8/1980 | Littlefield | |
| 4,268,657 | 5/1981 | Manzara | 528/155 |
| 4,304,896 | 12/1981 | Keller et al. | 528/9 |

FOREIGN PATENT DOCUMENTS 58-34822  3/1983  Japan .
59-149918 8/1984  Japan .

OTHER PUBLICATIONS

T. M. Keller & J. R. Griffith, "The Synthesis of a New Class of Polyphthalocyanine Resins", ACS Symp. Series, 132.

A. W. Snow & J. R. Griffith, "Synthesis and Characterization of . . . ", Macromolecules, vol. 17, Aug. 1984, pp. 1614–1624.

*Primary Examiner*—Howard E. Schain
*Attorney, Agent, or Firm*—Richard C. Stewart; Gerhard H. Fuchs

[57] ABSTRACT

Modified phenolic resins and cured resins prepared therefrom.

30 Claims, No Drawings

THERMOSETTABLE MODIFIED PHENOLIC RESINS

BACKGROUND OF THE INVENTION

1. Field of the Invention

This invention relates to certain novel modified phenolic resins. More particularly, this invention relates to such resins which have improved properties.

2. Prior Art

Phenolic resins are a class of synthetic materials that have grown continuously in terms of volume and applications for over several decades. The building blocks used in greatest volume are phenol and formaldehyde. Other important phenolic starting materials are the alkyl-substituted phenols, including cresols, xylenols, p-tert-butyl-phenol,p-phenylphenol, and nonylphenol. Diphenols, e.g., resorcinol (1,3-benzenediol) and bisphenol-A [bis-A or 2,2-bis(4-hydroxylphenyl)propane], are employed in smaller quantities for applications requiring special properties. In addition to formaldehyde, acetaldehyde or furfuraldehyde sometimes are employed but in much smaller quantities. The greater latitude in molecular structure, which is provided by varying the raw materials, chemistry, and manufacturing process, has made possible an extremely large number of applications for these products as a results of the array of physical properties that arise from the synthetic options.

The early investigation of the reaction of phenol and formaldehyde began with the work of von Baeyer and others in the early 1870s as an extension of phenolbased dye chemistry. The initial experiments resulted in soluble, amorphous products whose properties elicited little interest. Insoluble, cross-linked products were reported in the late 1880s, but these products also were not perceived us useful materials. In 1899, the first patent for a phenolic-resin product intended for use as a hard-rubber substitute was granted. The first commerical product was introduced as a shellac substitute by the Louis Bluner Company in the early 1900's. Process patents were issued in 1894 and 1895 for ortho- and para-methylolphenol, respectively.

Key innovations in early phenolic-resin manufacture included control of the molecular structure and the use of heat and pressure to achieve desirable physical properties in filled compositions. Studies in the use of acidic or basic catalysts and of changes in the molar ratio of formaldehyde to phenol resulted in the definition of two classes of polymeric materials which are referred to as Bakelite resins. Caustic-catalyzed products, which are prepared with greater than a 1:1 mol ratio of formaldehyde to phenol, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity. Possibly of greatest importance to early commercialization, however, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mole of formaldehyde per mole of phenol. The initial reaction involved in the preparation of resolated novolaks is carried out with an acid catalyst and less than a 1:1 mol ratio of formaldehyde to phenol. After formation of the novolak, the pH is adjusted so that the reacttion mixture is basic and additional formaldehyde is added. Resoles and resolated novolaks are inherently thermosetting and require no curing agent for advancement. Novolaks, by comparison, are thermoplastic and require the addtion of a curing agent, the most common being either hexamethylenetetramine or a resole. The stages of molecular weight advancement are characterized by liquid or solid phenolic polymer which is soluble in certain organic solvents and is fusible; a solid resin which is insoluble but swelled by organic solvents and, although softened by heat, exhibits essentially no flow; and an insoluble, infusible product which is not swelled by solvents nor softened by heat, i.e., the system is in a highly cross-linked state.

Phenolic resins have many uses. For example, such materials are used as bonding agents in friction materials such as brake linings, clutch facings, transmission bonds and the like. For example U.S. Pat. Nos. 4,096,108; 4,268,657; 4,218,361;, 4,219,452; and 3,966,670 describe various friction materials in which a phenolic resin is employed as the bonding agent. Phenolics are also used as molding materials, and as coatings and adhesives. Phenolics resins developed for non-flammability and long term temperature stability to 230° C. have been studied in carbon-fiber composites. Potential for such composites lies in advanced aircraft application.

While present day phenolics exhibit several beneficial properties they suffer from a number of disadvantages which restrict their utility. For example, such materials exhibit less than desirable thermal oxidative stability. Other major problems of present day phenolic technology include a need for auxilary chemicals such as hexamethylene tetraamine to crosslink the phenolic which often results in the production of volatile by-products such as ammonia during crosslinking. Still other problems result from the fact that crosslinking is often extensive and is not controllable.

Various modifications to phenolics have been proposed to obviate certain of the disadvantages attendant to these resins. For example, epichlorohydrin has been reacted with the hydroxyl groups of novalak forming epoxy novalak. Moreover, n-chloro-2-propene has been reacted with the hydroxyl groups of novalak to form the corresponding form methylon resin. Similarly, Japanese patent publication Nos. 59-149918 and 58-34822 describe a method of preparing a phenolic resin containing cyanate groups. In this method, a trialkyl ammonium salt of a phenol novolak is reacted with excess cyanhalogenide in an organic solvent.

Various new polymers have been proposed. For example, T. M. Keller and J. R. Griffith "The Synthesis of a New Class of Polyphthalocyanine Resins," ACS Symposium Series, 132, "Resin for Aerospace", Clayton A. May, U.S. Pat. No. 4,304,896, and Arthur W. Snow and James R. Griffith, "Sythesis and Characterization of Heteroatom-Bridged metal-free Phthalocyanine Network Polymers and Model Compound" Macromolecules, Vol. 17 August 1984, pp. 1614–1624 describe a process in which cyano groups undergo chain extension polymerization to form a cyclic product known as a polyphthalocyanine.

SUMMARY OF THE INVENTION

The present invention is directed to a modified phenolic of the Formula 1:

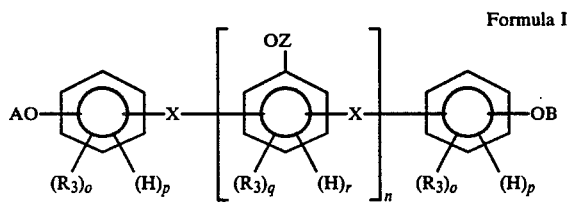

Formula I wherein:

A and B are the same or different and are cyano substituted aromatic moieties of the formula

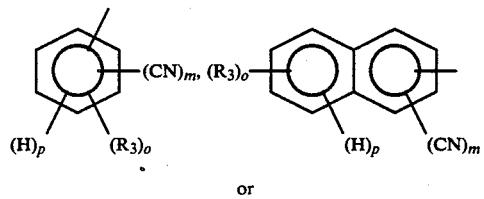

or

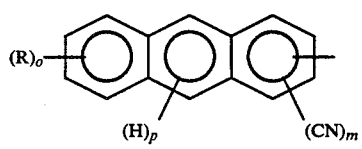

m is a positive whole number from 2 to about 4, with the proviso that at least two of the cyano groups are substituted at adjacent carbon atoms;

o and p are the same or different at each occurrence, and are positive whole numbers from 0 to 4, with the proviso that the sum of o and p is equal to 4;

n is a positive whole number greater than or equal to 1;

q and r are the same or different at each occurrence and are whole numbers from 0 to 3, with the proviso that the sum of q and r is equal to 3;

Z is hydrogen, A or B;

—X— is a divalent organic radical; and $R_3$ is the same or different at each occurrence and is a substituent other than hydrogen which is unreactive under conditions necessary to crosslink the cyano moieties of said A and/or B substituents.

Another aspect of this invention relates to precured compositions containing the above-referenced modified phenolic resin, and to partially cured, completely cured and incompletely cured compositions formed by the curing of the modified phenolic resin of this invention to varying degrees through use of appropriate curing agents as for example, heat or chemical curing agents.

As used herein, "completely cured" modified phenolic resins are those in which less than about 20 mole percent of the original cyano groups remain unreacted as determined by the method of infrared spectrophotometry; "precured" modified phenolic resins are those in which substantially not more than about 80 mole percent of the original cyano groups are reacted as determined by the method of infrared spectrophotometry; "partially cured" modified phenolic resins are those in which from about 40 to about 70 mole percent of the original cyano groups are unreacted as determined by infrared spectrophotometry; and "incompletely cured" modified phenolic resins are those in which from about 40 to about 20 mole percent of the original cyano groups are unreacted as determined by infrared spectrophotometry. Still, another aspect of this invention relates to such compositions comprising said phenolic resin, either in the precured, partially cured or incompletely cured state, in admixture with one or more other materials as for example, thermosetting and thermoplasic polymers such as kevlar and polyethylene, fillers as for example boron, carbon, and the like.

A limited aspect of this invention relates to a new phenolic resin which is formed by partially, incompletely or completely curing the phenolic resin of Formula I in the presence of a diamine of the formula: $H_2N$—R—$NH_2$, said cured resin of the Formula II:

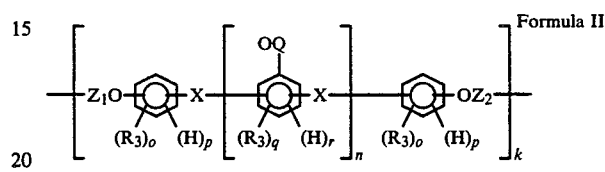

Formula II wherein:

k is a positive whole number;

—$Z_1$— is a trivalent moiety of the formula:

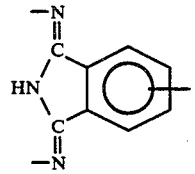

—$Z_2$— is a trivalent moiety of the formula:

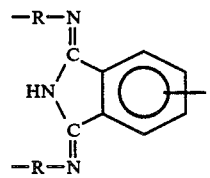

—R— is a divalent moiety;

Q is selected from the group consisting of hydrogen or —$Z_2$—, wherein the open valvency on the phenyl ring is bonded to the oxygen atom.

The cured resin derived from modified phenolic resin of this invention, and the modified phenolic resin of this invention exhibit several advantages over conventional phenolic resins. For example, certain of these materials are self crosslinking, and thus do not require auxilliary chemicals for crosslinking. Moreover, the cross-linked material has greater oxidative, mechanical and thermal stability as compared to conventional phenolic resins, and no volatile, potentially environmentally hazardous by-products are produced during crosslinking. Furthermore, the claimed crosslinked phenolic resins have higher char forming properties than the conventional phenolic resins.

DESCRIPTION OF THE PREFERRED EMBODIMENTS

One partially cured, completely cured or incompletely cured phenolic resin of this invention is formed by curing a modified phenolic resin of the Formula 1 under conditions described hereinbelow such that crosslinking aromatic phthalacyanine ring systems are formed by chain extension polymerization reaction between aromatic cyano groups. The modified phenolic resin of this invention can be conveniently crosslinked to form the cross-linked polymer of this invention using modifications of the procedures described in Arthur W. Snow and James R. Griffith, "Synthesis and Characterization of Heteroatom-Bridged Metal-Free Phthalacyanine Network Polymer and Model Compounds", Macromolecular vol. 17, pp. 1614–1624 (1984), T. M. Keller and J. R. Griffith "The Synthesis of a New Class of Polyphthalocyanine Resins", and U.S. Pat. No. 4,304,896. For example, an appropriate modified phenolic resin of the above formula can be crosslinked, preferably neat, with or without an acceptable catalyst at elevated temperatures.

The polymerization is induced thermally. The threshhold polymerization temperature can vary widely depending on a number of factors, as for example the presence or lack of a catalyst, the type of catalyst when used, and the like. In general, the threshhold polymerization temperature is equal to or greater than about 25° C. In the preferred embodiments of the invention, the threshold polymerization temperature is from about 100° C. to about 350° C., and in the particularly preferred embodiments is from about 100° C. about 300° C. Amongst these particularly preferred embodiments, most preferred are those embodiments in which the threshold polymerization temperature is from about 250° C. to about 280° C. Heating can be accomplished by conventional methods known to those of skill in the art. Illustration of such methods are heating with an oil bath, vacuum, hot air annealing, compression molding and the like.

The polymerization is preferably carried out in the presence of a catalytically effective amount of a catalyst. Useful catalyst can vary widely and include anhydrous metal salts such as stannous chloride dihydrate, cuprous bromide, cuprous cyanide, cuprous ferricyanide, zinc chloride, zinc bromide, zinc iodide, zinc cyanide, zinc ferrocyanide, zinc acetate, silver chloride, ferrous chloride, nickel chloride, ferric chloride, cobaltous cyanide nickel sulfate, stannic chloride, nickel carbonate, and the like. Also useful as catalyst are proton-donating organic reducing agents such as tetrahydropyridine, hydroquinone, 4,4-biphenol and the like. Amounts of the catalyst when used are not critical and can vary widely provided that the amount is sufficient to catalyze the reaction to the desired extent.

Reaction pressures are not critical and can vary widely. The reaction can be carried out at subatmospheric, atmospheric on super-atmospheric pressure. However, for convenience, the reaction is carried out at autogenous pressure or atomospheric pressure.

The other cured phenolic resin of this invention of the Formula II:

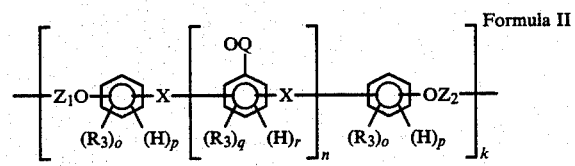

Formula II can be prepared by reacting a diamine of the formula:

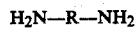

$H_2N-R-NH_2$ with the modified phenolic resin of this invention of the Formula I:

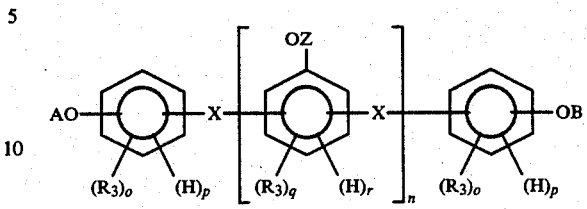

wherein A, B, —R—, $R_3$, —$Z_1$—, —$Z_2$—, n, o, p, q, r, —X—, k and Q are as described above. In this reaction, the adjacent cyano groups of A and/or B moieties react with the amino functions of the diamine to form linking divalent imine functions. This reaction is carried out by reacting appropriate amounts of the reactants neat at elevated temperatures. Reaction temperature and pressure are not critical and can vary widely. In the preferred embodiments of the invention, the reaction is carried out at a temperature of about 100° C. to about 200° C. at atmospheric or autogenous pressure. The ratio of the reactants are not critical and will depend on the degree of crosslinking desired. As apparent from the above structural formula, four moles of the diamine will react with two moles of the modified phenolic. Accordingly, to insure relatively complete crosslinking, the mole ratio of diamine to modified phenolic is usually about 2 to 1, or excesses of the diamine are employed.

In the above structural formulae, A and B are cyano substituted aromatic functions. Illustrative of useful A and B groups are 2,3-dicyanophenyl, 2,3,5-tricyanophenyl, 2,3-dicyano-5-chlorophenyl, 4,5-dicyanophenyl, 7,8-dicyanonaphthyl, 5,6-dicyanonaphthyl, 3,4-dicyanonaphthyl, 5,6-dicyano-7,8-dichloronaphthyl, 3,4-dicyano-2-methylphenyl, 4,5-dicyano-2-methoxyphenyl and the like.

$R_3$ is an inert substituent. Illustrative of suitable $R_3$ groups are such inert substituents as halogen, trihalomethyl, alkyl, alkoxy, phenyl and the like.

—X— is selected from the group consisting of divalent organic radicals. Illustrative of suitable X groups are substituted or unsubstituted methylene such as methylene, ethylmethylene, 2-ethylpentylmethylene, methylmethylene, isopropylmethylene, isobutylmethylene, pentylmethylene, furylmethylene, and the like; arylene such as 1,3-benzenedimethylene, phenylmethylene, 1,4-benzenedimethylene, 2,2-bis-(4-phenylene)propane, 4-methoxyphenylmethylene, bis-(4-phenylene)methane, 4,4-diphenylene dimethylethane and the like; and cycloalkylene such as cyclohexylene, cycooctylene, 1,3-cyclohexanedimethylene, and the like;

In the above structural Formula II, —R— is also a divalent organic radical. Suitable —R— groups include alkylene such as methylene, 2,5-dimethylhexamethylene, 4,4-dimethylheptamethylene, 2,2'-diethylene sulfone, 2,2'-diethylene sulfide, 3,3'-dipropylene sulfone, 3,3'-dipropylene ether, 3-methylheptamethylene, 3-methylhexamethylene, 3-methylheptamethylene, hexylene, 1,10-decalene, propylene, 1,7-heptatene, ethylmethylene, isobutylmethylene, 2,2-dimethylpropylene and the like; arylene such as 1,3-benzenedimethylene, 1,4-phenylene, 1,3-phenylene, naphthalene, 4,4-diphenylene, 2,2-bis-(4-phenylene)propane, 4-methoxy phenylene, 4-ethoxyphenylmethylene, bis-(4- phenylene)methane, 4,4'-phenylene propane, 4,4'-phenylene sulfone, 4,4'-phenylene sulfide, 4,4'-phenylene ether, 4,4-diphenylene dimethylene and the like; and cycloalkylene such as 1,4-cyclohexylene, 1,3-cyclopentylene, 1,3-cyclohexanedimethylene and the like; and alkylene terminated polydiorganosiloxanes such as bis-(3-propylene)tetramethyldisiloxane, bis-(4-butylene)tetramethylenedisiloxane and the like.

In the preferred embodiments of this invention the resin is formed by curing the resin of Formula I to form a crosslinked aromatic phthalocyanine ring system formed by reaction between adjacent cyano functions of "A" and/or "B" groups, and in which:

A and B are the same or different and are cyano substituted aromatic moieties of the formula:

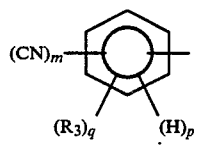

wherein:

q and r are the same or different and are positive whole numbers from 0 to 3, with the proviso that the sum of q and r is 3;

o and p are the same or different and are positive whole numbers from 0 to 4, with the proviso that the sum of 0 and p is 4;

Z is hydrogen, A or B, provide that from about 20 to about 80 mole percent of the Z moieties are A or B;

X is substituted or unsubstituted methylene or 1,4-phenyldimethylene wherein permissible substitutents are alkyl, halogen or furyl;

$R_3$ is alkyl; and n is a positive number from 1 to about 10.

Amongst the preferred embodiments most preferred are those embodiments of the above formula in which:

A and B are the same and are selected from the group consisting of cyano substituted aromatic moieties of the formula:

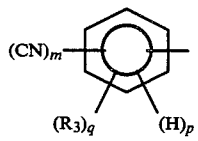

wherein:

m is 2 to 3;

O is 0 or 1;

p is 1 to 4;

Z is hydrogen or A, with the proviso that from about 35 to about 50 mole percent of Z moieties are A;

X is methylene, methylene substitued with alkyl having from about 1 to about 10 carbon atoms, furfuryl and xylene;

$R_3$ is methyl or ethyl;

n is 1 to about 6;

q is o or 1; and r is 1 to 3.

Amongst these particularly preferred embodiments, most preferred are those embodiments wherein A and B are the same and are moieties of the formula:

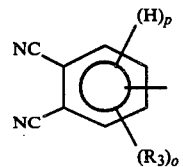

wherein n is 1 to about 4;

p is 3;

o is 0;

Z is A or hydrogen, with the proviso that from about 40 to about 45 mole percent Z moieties are A;

q is 0;

—X— is a moiety of the formula:

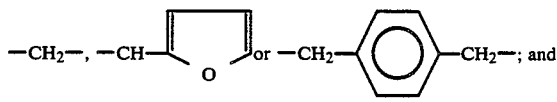

r is 3.

The least preferred embodiments of the invention are those in which the partially, completely and incompletely cured resin of Formula II in which the resin of Formula I is cured in the presence of a diamine compound. In these embodiments, it is preferred that the diamine compound be selected from those of the formula:

$$H_2N—R—NH_2$$

wherein:

—R— is selected from the group consisting of divalent aromatic hydrocarbon radicals having from 6 to about 20 carbon atoms and halogenated derivatives thereof, divalent alkylene radicals having from 1 to about 20 carbon atoms, divalent cycloalkylene having from 3 to about 20 carbon atoms, divalent polydiorganosiloxanes terminated with alkylene having from about 2 to about 8 carbon atoms, and divalent radicals of the formula:

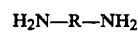

wherein —$R_4$— is selected from the group consisting of

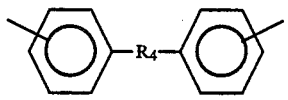

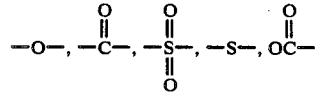

and —$C_yH_{2y}$— where y is 1 to about 20, and q, r, o, p, $R_3$, —X—, —$Z_1$—, —$Z_2$—, A and B are as described above in the preferred embodiments of this invention. In these embodiments, it is more preferred that —R— is selected from the group consisting of divalent aromatic radicals and halogenated derivatives thereof, and divalent radicals of the formula:

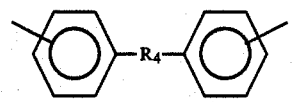

and it is most preferred that —R— is selected from the group consisting of phenylene, dephenylene, and devalent radicals of the aforementioned formula in which Q is

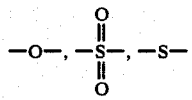

and $C_yH_{2y}$ where y is 1 to about 5.

A reinforced and/or filled compositions comprising the completely cured, partially cured, and incompletely cured compositions of this invention, precured compositions which may be used in the preparation of such reinforced compositions are also part of the invention disclosed herein. The completely cured, precured, partially cured, and the incompletely cured compositions as described, may contain fillers for use in where structural strength and integrity of a structure has to be maintained, and for other purposes known to those of skill in the art. Any suitable filler known to those of skill in the art can be used. Such fillers may be selected from a wide variety of organic and nonorganic materials such as polymers, minerals, metals, metal oxides, siliceous materials and metal salts. Illustrative of useful fillers are fiber glass, steel, abestos fibers, aramide, boron and carbon fibers, as well as plate like, fibrous and particulate forms of alumina, brass powder, aluminum hydrates, iron oxide, feldspar, lead oxides, asbestos, talc, barytes, calcium carbonates, clay, carbon black, quartz, novaculite and other forms of silica, kaolinite, aluminum silicate bentonite, garnet, mica, saponite, beidelite, calcium oxide, fused silica calcium hydroxide, and the like. Other useful fillers include thermoplastic polymer as for example polyesters, polyimides, polyamides, polysulfones, polyaramids, polyester carbonates, polyethers, polyethersulfones, polyethylene, polypropylene, polycarbonates, polyetherimides, polysulfides, polyacrylates, polyvinyls and the like. The foregoing recited fillers are illustrative only and are not meant to limit the scope of the fillers that can be utilized in this invention. Methods for producing reinforced and/or filled compositions include melt blending, extrusion and molding processes, simple mixing and dispersion fo both materials in a suitable medium by methods known in the art.

The modified phenolic resin of this invention of the Formula I in prepared by a nucleophilic displacement reaction. In this reaction, a cyano substituted aromatic compound of the formula:

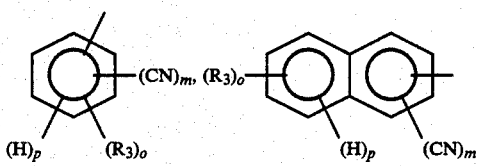

or

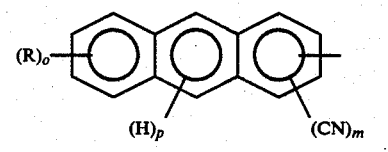

in which $R_3$, m, p and o are as defined above, and Y is a leaving group such as fluoro or nitro, is reacted with alkali metal phenolic salt of the formula:

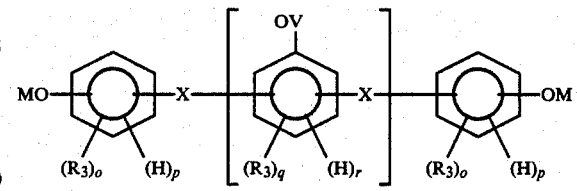

wherein $R_3$, o, p, X, q, r and n are as defined above M is an alkali metal salt and V is M or hydrogen, preferably under nitrogen in the presence of an aprotic solvent.

Reaction temperatures can vary widely and are preferably from about 40° C. to about 150° C. with agitation and more preferably from about 50° C. to about 60° C.

Useful aprotic solvents can vary widely, the only requirement being that the solvent is inert under the reaction conditions. Illustration of aprotic solvents useful in the conduct of this reation are N,N-dimethyl acetamide, N,N-dimethyl formamide, N-methyl-2 pyrrolidone, cyclohexanone, and dimethyl sulfoxide and mixtures thereof. The preferred solvent is N-methyl-2-pyrrolidone.

Reaction times can vary considerably and will depend upon such factors as the degree of agitation, temperature, nature and proportion of reactants and the like. Preferred reaction times are from about 4 hours to about 6 hours.

The reaction product can be recovered by conventional means. For example, the crude polymeric product can be recovered by pouring the reaction mixture into an excess of aqueous acid such as 10% hydrochloric acid. The final polymer can be reprecipitated by standard technique such as redissolving in N-methyl 1,2-pyrrolidone and reprecipitating from water. The product can then be dried in vacuum oven for 24 hr.

The cyano substituted aromatic compounds and the phenolic resins used in the preparation of the modified phenolic resins of this invention are known materials, which can be obtained commercially or prepared by known procedures. For example, phenolic resins can be conveniently prepared by reacting an aldehyde such as formaldehyde and a phenol such as phenol in the presence of an acid or base catalysts. The cyano substituted aromatic compound can be prepared by amination of the corresponding anhydride followed by nitration. The resulting nitro compound can be treated with ammonium hydroxide to form the corresponding amide which is then dehydrated with a dehydrating agent such as phosphorous chloride to form the desired cyano substituted aromatic compound.

The precured, completely cured, incompletely cured and partially-cured compositions of this invention are useful in forming a wide variety of industrial products, including shaped articles, as produced by known shaping processes. Precured compositions can be formed (i.e., shaped) into articles which can then be cured to form completely cured, incompletely cured and partially-cured articles. Shaped articles produced from the polymer composition include windscreens such as windshields, structural parts, canopies, door windows wire housing and the like. The shaping process can be any process known to one skilled in the art, such as injection, blow or extrusion molding. Another use of the crosslinked polymer of the member is a binding agents in the manufacture of friction materials such as brake linings, clutch facings and transmission bands, as for example those described in U.S. Pat. Nos. 3,966,670, 4,268,657, or 4,281,361. Still other uses of the polymers of this invention are molding materials, composites for use in the manufacture of structural parts and the like.

EXAMPLE 1

A mixture of 2 g of Novolac of number average molecular weight 573, 2 g of anhydrous potassium carbonate was dissolved in 20 ml of dry dimethyl sulfoxide. The temperature of mixture was raised to 50° C. and 2 g of 4-nitrophthalonitrile was added slowly under nitrogen atmosphere. The reaction mixture was stirred and heated at 55°-60° C. for 6 hr. under a nitrogen atmosphere. After cooling the product was slowly poured 500 ml of 10% hydrochloric acid solution. The precipitate was isolated by suction filtration and washed with water until neutral. The product was dried in a vacuum oven for 24 hr. The IR spectrum of phenolic phthaloyamine resis shows characteristic peak at 2232 cm−1 (—C≡N), strongly and broad band at 3312 cm−1 (—OH (phenolic)) and 1203, 1252, 1280 cm−1 (phenyl—O—).

EXAMPLE 2

A mixture 7.8 g of Novolac, 29 of 50% aqueous sodium hydroxide, 35 ml of dry dimethyl sulfoxide and 25 ml of toluene was stirred at 110°-120° C. under nitrogen atmosphere. The water and toluene were removed with a Dean-Stark trap over a period of 2 hr. The reaction mixture was cooled to 50° C., and 4.49 of 4-nitrophthalonitrile was added at 90°-100° C. under nitrogen atmosphere and then poured into 5% HCl solution (800 ml). The brown colored solid which separated was collected by suction filtration, washed with large excess of water (3×500 ml), and dried under vacuum oven at 50° C. for 48 hr. The IR spectrum was consistant with the proposed structure.

EXAMPLE 3

A mixture of 39 of poly p-xylene phenolic dimethoxy-o,p-xylene) 1.7 g of anhydrous potassium carbonate was dissolved in 25 ml of dimethyl sulfoxide. The temperature of mixture was raised to 50° C.–60° C., and 2 g of 4-nitrophthlonitrile was added slowly under nitrogen atmosphere. The reaction mixture was stirred and heated at 60° C. for 4 hr. under a nitrogen atmosphere. After cooling the product was slowly poured into 500 ml of 6 10% HCl-solution. The precipitate was isolated by suction filtration and washed with water until neutral, the product was dried in a vacuum oven at 50° C. for 24 hr.

EXAMPLE 4

Phenol-furfuraldehyde resin (2.5 g) was dissolved in 30 ml dimethyl sulfoxide at room temperature under nitrogen atmosphere. The temperature was raised to 50° C. and 2.3 g of anhydrous potassium carbonate was added. After the addition, the temperature was raised to 70° C., and 3.26 g of 4-nitrophthalonitrite were added. The temperature of the reaction mixture was raised to 100° C. and for three hours. The reaction mixture was cooled to room temperature and the reaction product precipitated in 5% HCl solution. The product obtain was a yellow solid. The solid was washed in water and dried in vacuum oven at 50° C. for 4 hr.

EXAMPLE 5

A series of experiments were carried out for the purpose of evaluating the thermal characteristics of certain embodiments of this invention and to compare same to the base phenolic resin. In these experiments, thermogravimetric analysis (TGA) was carried out in an argon atmosphere to determine the weight loss of a sample as a function of temperature and the % Char at 900° C. These experiments were carried out using a Dupont-1090 thermogravimeter at a heating rate of 10° C./min. The typical sample size was 30–34 mg. The results of these experiments we set forth in the following Table I.

TABLE I

| Exp No. | Sample | % Weight Loss at °C. | | | | | | | % Char at 900° C. |
| --- | --- | --- | --- | --- | --- | --- | --- | --- | --- |
| | | 100° C. | 200° C. | 300° C. | 400° C. | 450° C. | 500° C. | 900° C. | |
| 1. | RD-27 Novolac | 0.2 | 0.6 | 4.1 | 26.4 | 34.6 | 38.6 | 55.2 | 44.8 |
| 2. | Ex. 1 | 0.4 | 2.3 | 7.2 | 9.3 | 11.2 | 13.8 | 34 | 66 |

What is claimed is:

1. A modified phenolic resin of the formula:

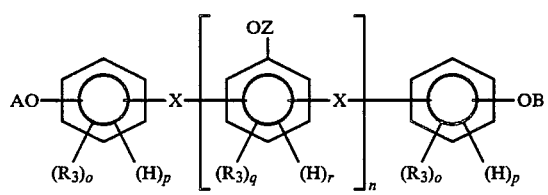

wherein:

A and B are the same or different and are aromatic moieties substituted by at least two cyano moieties, at least two of said cyano molecules are substituted on adjacent carbon atoms, said aromatic moieties of the formula:

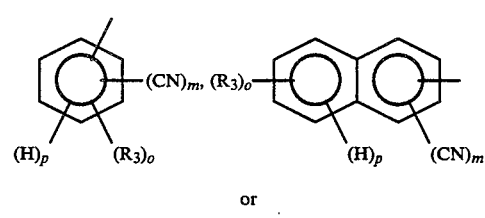

or

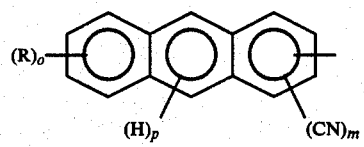

m is a positive whole number from about 2 to about 4;
o and p are the same or different at each occurence and are whole numbers from 0 to 4, with the proviso that the sum of 0 and p is equal to 4;
q and r are the same or different and are whole numbers from 0 to 3 with the proviso that the sum of q are r is equal to 3;
Z is hydrogen, A or B;
—X— is a divalent organic radical;
$R_3$ is the same or different at each occurence and is a substituent other than hydrogen which is unreactive under conditions necessary to crosslink the cyano moieties of said A and/or B moieties and;
n is a positive whole number.

2. A resin according to claim 1 where in A and B are consisting of cyano substituted aromatic moieties of the formula:

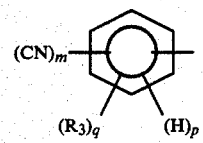

3. A resin according to claim 2 where A and B are the same.

4. A resin according to claim 2 wherein:
m is 1 to 3; and
o and p are the same or different are numbers from 0 to 3 with the proviso that the sum of o and p is 3.

5. A resin according to claim 4 wherein:
o is 0 to 1; and
p is 1 to 3.

6. A resin according to claim 5 wherein:
m is 2;
p is 3; and
o is 0.

7. A resin according to claim 1 wherein from about 20 to about 80 mole percent of Z are A or B.

8. A resin according to claim 7 wherein from about 35 to about 50 mole percent of Z are A or B.

9. A resin according to claim 1 wherein X is substituted or unsubstituted methylene or 1,4-phenyldimethylene, wherein permissible substituents are alkyl having from 1 to about 10 carbon atoms and furyl.

10. A resin according to claim 9 wherein —X— is a moiety of the formula:

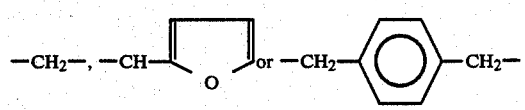

11. A resin according to claim 2 where in n is from 1 to about 10.

12. A resin according to claim 11 wherein n is from 1 to about 4.

13. A resin according to claim 2 wherein:
q and r are the same or different and are positive numbers from 0 to 3, with the proviso that the sum of q and r is 3.

14. A resin according to claim 13 wherein:
q is 0 or 1; and
r is 1 to 3.

15. A resin according to claim 14 wherein:
o is 0; and
p is 3.

16. A resin according to claim 2 wherein $R_3$ is alkyl.

17. A resin according to claim 16 wherein $R_3$ is methyl or ethyl.

18. A completely cured resin formed by subjecting the resin of claim 1 to extension polymerization reaction to the extent sufficient to form said completely cured resin.

19. An incompletely cured resin formed by subjecting the resin of claim 1 to extension polymerization reaction to the extent sufficient to form said incompletely cured resin.

20. A partially cured resin formed by subjecting the resin of claim 1 to extension polymerization reaction to the extent sufficient to form said partially cured resin.

21. A composition comprising a modified phenolic resin of the formula:

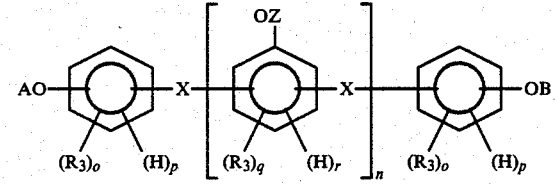

and one or-more fibrous or particulate fillers, wherein:
A and B are the same or different and are aromatic moieties substituted by at least two cyano moieties, at least two of said cyano molecules are substituted at adjacent carbon atoms, said aromatic moieties of the formula:

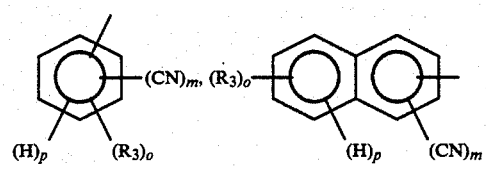

or

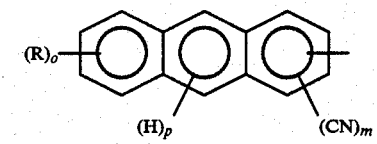

wherein:
m is from 2 to about 4;
o and p are the same or different at each occurrence and are whole numbers from 0 to 4 with the proviso that the sum of o and p is equal to 4;
q and r are the same or different and are whole numbers from 0 to 3 with the proviso that the sum of q and r is equal to 3;
Z is hydrogen, A or B;

—X— is a divalent organic radical;

$R_3$ is the same or different at each occurrence and is a substituent other than hydrogen which is unreactive under conditions necessary to crosslink the cyano moieties of said A and/or B moieties; and n is a positive whole number.

22. A composition according to claim 21 wherein said fillers are particulate.

23. A composition according to claim 21 wherein said filers are fibrous.

24. A completely cured resin formed by subjecting the composition claim 21 to extension polymerization reaction to the extent sufficient to form said completely cured resin.

25. An incompletely cured resin formed by subjecting the composition of claim 21 to extension polymerization reaction to the extent sufficient to form said incompletly cured resin.

26. A partially cured resin formed by subjecting the composition of claim 21 to extension polymerization reaction to the extent sufficient to form said partially cured resin.

27. A partially, completely or incompletely cured phenolic resin of the formula:

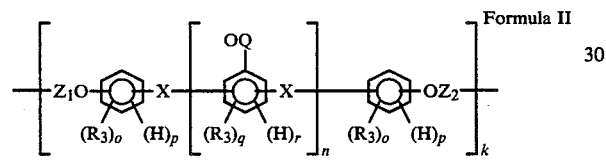
Formula II wherein k is a positive whole number;

—R— is a divalent organic radical;

n is a positive whole number;

—$Z_1$— is a moiety of the formula:

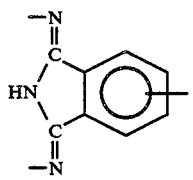

—$Z_2$— is a moiety of the formula:

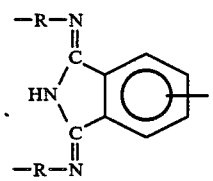

Q is hydrogen, —$Z_2$— or a combination thereof;

o and p are the same or different at each occurrence and are whole numbers from 0 to 4 with the proviso that the sum of o and p is equal to 4;

q and r are the same or different and are whole numbers from 0 to 3 with the proviso that the sum of q and r is equal to 3;

$R_3$ is the same or different at each occurrence and is a substituent other than hydrogen which is unreactive under conditions necessary to form the cured resin.

28. A resin according to claim 27 wherein —R— is selected from the group consisting of divalent aromatic hydrocarbons rodicals having from 6 to about 20 carbon atoms and halogenated derivatives thereof divalent alkylene radicals having from 1 to about 20 carbon atoms, polydiorganosiloxanes terminated with alkylene having from about 2 to about 8 carbon atoms and divalent radicals of the formula:

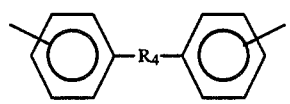

wherein —$R_4$— is selected from the group consisting of

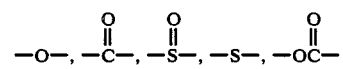

and —$C_yH_{2y}$ where y is 1 to about 20.

29. A resin according to claim 18 wherein —R— is selected from the group consisting of divalent aromatic radicals and halogenated derivatives thereof, and divalent radicals of the formula:

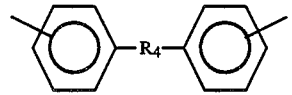

30. A resin according to claim 28 wherein —R— is selected from the group consisting of phenylene, diphenylene and divalent radicals of the formula:

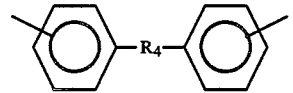

wherein —$R_4$— is

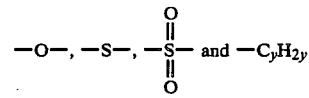

where y is 1 to about 5.

* * * * *